Jan. 13, 1959     E. F. BAXTER     2,867,890

METHOD OF MAKING DECORATIVE MATERIAL

Filed Nov. 29, 1956 nited States Patent Office 2,867,890
Patented Jan. 13, 1959

2,867,890

METHOD OF MAKING DECORATIVE MATERIAL

Edna Florence Baxter, Cambridge, England

Application November 29, 1956, Serial No. 625,185

Claims priority, application Great Britain November 30, 1955

11 Claims. (Cl. 28—72)

This invention relates to the forming of synthetic plastic materials for the production of a novel article of manufacture. The article of the invention can be used for various purposes, including use as a decoration.

The invention consists of a method of shaping a synthetic plastic material, which comprises forming an elongated strip of thin material to present a continuous portion extending along the length of the strip and a series of discrete individually movable portions extending from said continuous portion at a substantial angle thereto twisting said continuous portion approximately about its longitudinal axis, and setting or fixing the said portion in its twisted form.

A preferred material for use with the invention is a very thin plastic transparent material and especially such a material which has been metallised on one surface. When such a material is appropriately used, a novel effect is obtained, the nature of which will be described in more detail hereinafter, but which, briefly, is that the material becomes highly sensitive not only to light air currents but also to radiation, to produce an attractive and changing appearance.

Thus the invention also includes a method of shaping a synthetic plastic material, which comprises applying a metallic reflecting coating to one surface of a sheet of said material of thickness not greater than .001 inch, forming an elongated strip of said material to present a continuous portion extending along the length of the strip and a series of discrete individually movable portions extending from said continuous portion at a substantial angle thereto, twisting said continuous portion approximately about its longitudinal axis, and setting or fixing the said portion in its twisted form.

A material that can be used with the invention with particular advantage is one which has the property of being "set" without the use of adhesive or heat, but merely by subjecting the material after it has been shaped as described above to appropriate conditions. For example, as will also appear in more detail hereinafter, polyethylene terephthalate can be shaped as described and can then be set either by applying endwise tension to the material, or winding the material on a spool, under a tension such as would normally be used, and leaving it in that condition for a period of time.

Thus, the invention further comprises a method of shaping a synthetic plastic material settable by the application of tension, which comprises forming an elongated strip of thin material to present a continuous portion extending along the length of the strip and a series of discrete individually movable portions extending from said continuous portion at a substantial angle thereto, twisting said continuous portion approximately about its longitudinal axis, and subjecting said material to longitudinal tension to set said portion in its twisted form.

Other features and advantages of the invention will appear from the following description of embodiments thereof, given by way of example in conjunction with the accompanying drawings, in which Figure 1 is a diagrammatic plan view of the strip;

In a first embodiment of the invention a thin strip 10 of clear, transparent polyethylene terephthalate, such as that available commercially under the trademark Melinex or Mylar, provided on one surface with a layer 11 of aluminum deposited by thermal evaporation in vacuum, is fed through a slitting machine to produce a series of close parallel slits extending from one edge of the strip. The dimensions of the strip and the slits can be widely varied but in this particular embodiment a strip about 1½ inches in width is used, and the slits, at right angles to the length of the strip are about 1¼ inches long, and are regularly spaced at about 25–75 slits to the inch. The slits can, if desired, be made of varying lengths. In this way one edge of the strip at 13 is left uncut. The width of the unslit part 13 of the strip will thus be about ¼ inch; if a narrower strip 10 is used it is found desirable that the unslit width should not be much reduced below this figure when using the material mentioned.

Figure 1:
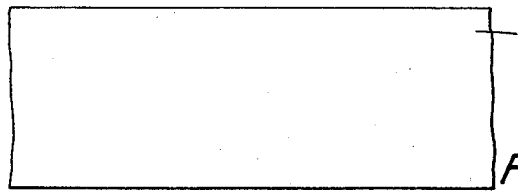
Figure 2:
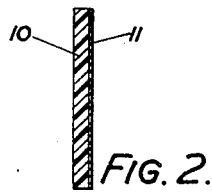
Figure 2 is a diagrammatic end view of the strip of Figure 1.

The strip is twisted about its longitudinal axis and a large number of twists are imparted per unit length of the strip when the ends of a strip such as that shown in Figure 2 are twisted with respect to one another, it will be appreciated that the effect of the first two turns is to produce merely a helical form to the unslit portion 13, with the tongues 12 extending from it in a comparatively regular fashion.

As the degree of twist is increased, however, a point is reached where the form of portion 13 collapses from the helical shape into a shape resembling a thread or cord of substantially less diameter than the width of portion 13. The collapse can be relatively regular, in which case the thread is tube-like, or it may be accompanied in some measure by longitudinal folds. In either case if one considers the strip to be composed of an infinite number of longitudinal fibres, then these fibres, in the twisted material, will all suffer approximately the same extension. In consequence, the inherent tensile strength of the material is largely retained.

Figure 4:
Figure 4 is a view of the strip after twisting.

The resulting material is shown diagrammatically in Figure 4. The thread or cord 14 will be seen to be of substantially less diameter than the width of portion 13. In the practical case and using a strip such as that described above, the thread 14 might be of approximately .025 inch in diameter.

The tongues 12 can be made to project from the thread 14 in a manner which is largely irregular, and as the tongues by reason of thinness and narrowness do not remain absolutely straight along their length there is given to the twisted material a bright, glistening appearance. This irregularity is enhanced if the slits in the strip 10, by which tongues 12 are produced, vary slightly in length from one to another.

Once the material has been twisted to the shape shown it is necessary that it should be "set"; it is obviously highly inconvenient if the ends of the twisted material have to be held to prevent it untwisting, and the polyethylene terephthalate described is particularly advantageous in this respect for a reason that will not be readily apparent. I have found that for the purpose of my process it is possible to "set" this material without recourse to heat or adhesive, but merely by the use of tension applied at room temperature.

One way of "setting" the twisted material is merely to apply to it an endwise tension. The "set" produced appears to be a function both of the magnitude of the tension applied and the period for which it is applied. Thus, it is possible to achieve an immediate and permanent set by applying a sufficiently large force to the twisted strip. The material is stretched slightly and thereafter can be handled in the ordinary way without any danger of reversion to the original flat strip form.

Alternatively, the "set" can be produced by a lesser endwise tension applied for a period of time. Thus, if the material, after twisting as described, is spooled under moderate endwise tntesion and then left for a period of time say twenty-four hours, a permanent set will likewise be produced. The appropriate combination of time and tension necessary to produce the set with any given material can easily be determined by simple experiment.

The second of the two methods described above is preferred for two reasons: partly because the necessary tension can be applied to the twisted material whilst it is being twisted and partly because polyethylene terephthalate strip as at present commercially available is not of uniform thickness. The tension which can be applied safely to the film without breakage accruing is governed by the minimum thickness of the film. Due to this variation in thickness it is not advisable to make the apparatus apply a tension while twisting the film which will effect the permanent "set" mentioned above, since the correct tension is related to the thickness, and so the non-uniform thickness may lead to breakages on the one hand or inadequate "set" on the other.

Heat can be used to give a set to the material but its use involves difficulties and the methods described are much preferred.

It is extremely desirable that the film of material used should be as thin as possible, consistent with adequate mechanical strength. Very thin material, especially if the slits are very close together, will result in the tongues being extremely light, and therefore sensitive to even small air currents. If the material is metallised there will be in consequence a pleasing glittering effect as the tongues are moved.

Polyethylene terephthalate extruded film has the further property in that it can be preferentially forward drawn to give it a much greater tensile strength along say its length than across its width. In the manufacture of the film this is done by stretching the hot extruded film more in one direction (its length) than in the other (its width) so as to orientate all the molecules to lie in substantially the same direction along the length of the film. Such a preferentially forward drawn material is very suitable for the purposes of the present invention. The term "preferentially" as used herein designates that the material when drawn is drawn under tension in such a way that its tensile strength in the two directions at right angles is not the same. The term "preferentially drawn" is generally used in the pertinent industry in that sense. In the most recent publications the term "tensilated" is more frequently used than the term "preferentially forward drawn," both terms designating the same drawing operation.

The use of a very thin material which is metallised on one surface has another advantage which, again, is not at once apparent. This advantage resides in the fact that the small projecting parts or tongues will be deformed when there is even a small temperature differential between their opposite surfaces. Such temperature differential arises if radiation falls on the plastic surface, when the radiation is twice transmitted through the material due to the reflection at the metallic surface, and also when there is a change of ambient temperature; in the latter case the different thermal conductivities at the two surfaces cause different rates of temperature rise. With this object, very thin material of .001 inch or less, is advantageous.

Added to the fact that the projections are very thin and light, and therefore moved by even light air currents, the projections present an attractive, continuously shimmering appearance.

Polyethylene terephthalate is also advantageous in that it has a very high tensile strength, especially when preferentially forward drawn as described, and that it is extremely resistant to crushing. The former property enables a thinner material to be used for a given strength of the finished product, and thinness is important in obtaining the best effect. The resistance to crushing is of great advantage in packaging the finished article; for use as tinsel the material can be spooled with ordinary tension, and when unspooled it immediately assumes a shape with all the tongues standing out from the thread or cord.

In some applications the slit strip 12, 13 can be wound upon a former, for example an aluminium or iron wire 15. The resulting centre part of the finished material will be thicker but otherwise approximately as shown in Figure 4. With the stiff centre the material can be supported at one end, and lengths of such material can be used to make Christmas trees and other decorations. When winding the strip onto the wire centre, it is advantageous to coat the wire with adhesive material. With such a core wire the strip can be wound onto it comparatively regular so that in this case also all the longitudinal fibres of which the strip can be considered to be composed remain equally extended in the finished article.

Figure 5:
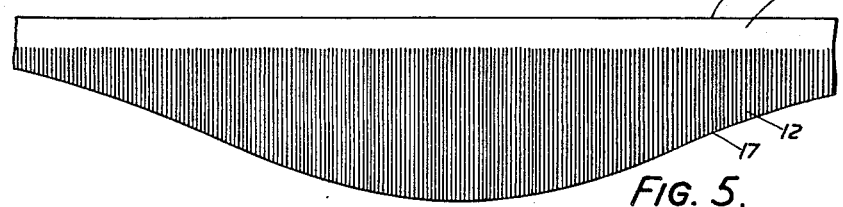
Figure 5 is a diagrammatic plan view of the strip after slitting in a form suitable for making tree branches.

When forming the strip material by either of the methods described above, the process can be modified. One such modification comprises shaping the strip 10, for example as shown in Figure 5, so that it has one straight edge 16 and one non-straight edge 17. The strip is slit by close parallel cuts to form tongues 12 as before, but these cuts extend from the non-straight edge; an uncut margin 13 is left along the straight edge. When twisted, a strip such as that of Figure 5 will produce an effect similar to that of Figure 4 except that there will be periodic increases and decreases of diameter along the length of the article used with a core wire such as 15, the cut lengths produce a more effective appearance when used for a Christmas tree, as described above.

Figure 7:
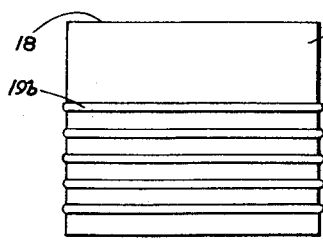
Figure 7 is a view of a spool suitable for setting the tongues of the strip of Figure 3.
Figure 7:
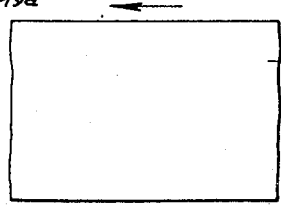

Another modification consists in giving to the tongues a permanent "set" along their length. A simple method of doing this, again possible with polyethylene terephthalate because of its unusual properties, is to wind the strip 10, after it has been slit to form the parts 12, 13, upon a reel 18 (Figure 7). The reel 18 has a cylindrical part 19a and a corrugated part 19b. The strip 10 before slitting is wound onto the reel. If an appropriate winding tension is used, with or without heat, and the strip is allowed to remain reeled for a period of time, the portion over the corrugated part 19b becomes permanently corrugated, and can be used for the slit part of the strip. The glistening appearance of the article is thereby improved.

The polyethylene terephthalate can be made clear and very transparent, and this has the advantage that both surfaces of the aluminised or otherwise metallised surface of the material will appear bright. The metallised material can be coloured by applying a coloured lacquer thereto, if desired. Further, the coated material does not burn readily but with a suitable lacquer its inflammability can be very much reduced.

Figure 6:
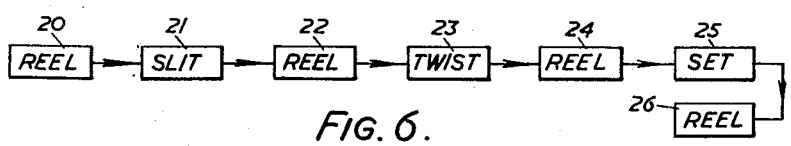
Figure 6 is a flow diagram of the process.

A flow diagram of the process of the invention is shown in Figure 6. The material in strip form and after metallising is reeled as at 20 either onto a smooth surfaced reel or onto a reel with a corrugated surface, and is then slit, in the manner shown in Figure 3, at 21 and reeled at 22.

The slit strip is then twisted at 23 and reeled again at 24, set at 25 and finally reeled at 26. If the set is obtained by tension during twisting, stage 24 will be omitted.

Figure 3:
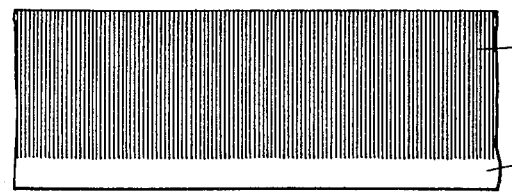
Figure 3 is a diagrammatic plan view of the strip after slitting.

In a further modification, instead of slitting the material 10 from one edge only, as in Figure 3, it can be slit from both edges leaving the unslit portion in the middle. At present, however, the arrangement of Figure 3 is preferred.

What is claimed is:

1. A method of shaping a synthetic plastic material, which comprises forming an elongated strip of thin material to present a continuous portion extending along the length of the strip and a series of discrete individually movable portions extending from said continuous portion at a substantial angle thereto, twisting said continuous portion approximately about its longitudinal axis, and setting the said portion in its twisted form.

2. A method of shaping a synthetic plastic material, which comprises applying a metallic reflecting coating to one surface of a sheet of said material of thickness not greater than .001 inch, forming an elongated strip of said material to present a continuous portion extending along the length of the strip and a series of discrete individually movable portions extending from said continuous portion at a substantial angle thereto, twisting said continuous portion approximately about its longitudinal axis, and setting the said portion in its twisted form.

3. A method of shaping a synthetic plastic material settable by the application of tension, which comprises forming an elongated strip of thin material to present a continuous portion extending along the length of the strip and a series of discrete individually movable portions extending from said continuous portion at a substantial angle thereto, twisting said continuous portion approximately about its longitudinal axis, and subjecting said material to longitudinal tension to set said portion in its twisted form.

4. A method of producing articles in which method a thin flexible strip of suitable material is slit by a series of close, parallel slits extending inwardly from one at least of the longitudinal edges of the material, but leaving an unslit longitudinal portion of said material, and twisting said unslit portion so as to cause the slit portions of the material to radiate outwardly from the twisted portion thereof.

5. A method of producing articles in which method a strip of polyethylene terephthalate film to one surface of which a metal is applied, is slit by a series of close, parallel slits extending inwardly from preferably one edge of the strip, but leaving an unslit portion of said strip, and winding said unslit portion so as to cause the slit portions of the film to radiate outwardly from the wound unslit portion, and maintaining said unslit portion twisted until a permanent "set" is effected in said film.

6. A method of producing articles in which method a strip of tensilated polyethylene terephthalate film, to one surface of which a metal is applied, is slit by a series of close, parallel slits extending inwardly from one at least of the longitudinal edges of the material, but leaving an unslit longitudinal portion of said film and twisting said unslit portion to form a twisted thread, so as to cause the slit portions of the film to radiate outwardly from the twisted thread, while stretching the twisted film to effect a permanent "set" therein.

7. A method according to claim 4, in which said slits extend inwardly from both edges of said strip leaving an unslit central portion.

8. A method according to claim 6, in which said slits extend inwardly from one edge of said strip leaving an unslit portion along the other edge.

9. A method according to claim 4, in which said slits extend inwardly from one edge only of said strip and said unslit portion is wound onto a thin elongated support member.

10. A method according to claim 9, in which said unslit portion is secured to said support member by adhesive.

11. A method according to claim 1, in which the penetration into said unslit portion of each of said slits varies very slightly in relation to the penetration of adjacent slits.

References Cited in the file of this patent

UNITED STATES PATENTS 2,808,854      Lewis _____ Oct. 8, 1957